United States Patent
Matsukuma et al.

(10) Patent No.: US 7,605,558 B2
(45) Date of Patent: Oct. 20, 2009

(54) ROBOT SYSTEM

(75) Inventors: Kenji Matsukuma, Kitakyushu (JP); Michiharu Tanaka, Kitakyushu (JP); Yasuyuki Inoue, Kitakyushu (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 11/814,839

(22) PCT Filed: Jan. 5, 2006

(86) PCT No.: PCT/JP2006/300029

§ 371 (c)(1), (2), (4) Date: Jul. 26, 2007

(87) PCT Pub. No.: WO2006/080179

PCT Pub. Date: Aug. 3, 2006

(65) Prior Publication Data

US 2009/0009125 A1    Jan. 8, 2009

(30) Foreign Application Priority Data

Jan. 26, 2005  (JP) ............... 2005-017798

(51) Int. Cl.
*B25J 9/22* (2006.01)
*G05B 19/42* (2006.01)

(52) U.S. Cl. .............. 318/568.13; 318/568.11; 318/568.12; 318/568.15; 318/568.16; 901/1

(58) Field of Classification Search ............... 318/568.11–568.16
See application file for complete search history.

(56) References Cited

U.S. PATENT DOCUMENTS 7,228,202 B2 * 6/2007 Carlson et al. .......... 700/245
2005/0055130 A1 * 3/2005 Carlson et al. .......... 700/245

FOREIGN PATENT DOCUMENTS

| JP | 07-195285 A | 8/1995 |
| JP | 9117888 * | 5/1997 |
| JP | 2000-280193 A | 10/2000 |
| JP | 2004-148488 A | 5/2004 |
| JP | 2004-160128 A | 6/2004 |
| KR | 1999-0036450 A | 5/1999 |

OTHER PUBLICATIONS

Korean Office Action dated Oct. 13, 2008.

* cited by examiner

*Primary Examiner*—Bentsu Ro
*Assistant Examiner*—Erick Glass
(74) *Attorney, Agent, or Firm*—Sughrue Mion, PLLC

(57) ABSTRACT

The present invention provides a safe robot system adapted to always and clearly indicate a worker whether an emergency stop operation can be performed by an emergency stop operation section in an unwired portable teaching operation section, thereby to prevent occurrence of a misconception.

A portable teaching operation portion 3 includes a display section (13) configured to indicate whether an emergency stop operation to be conducted by an emergency stop operation section (9) can be performed.

13 Claims, 8 Drawing Sheets

ROBOT SYSTEM

TECHNICAL FIELD

The present invention relates to a robot system. More particularly, the present invention relates to a robot system relates to a robot system configured to wirelessly connect between a portable teaching operation portion, which has an emergency stop operation section that brings a robot into a stopped state, and a control portion which controls the robot.

BACKGROUND ART

A robot system for controlling an industrial robot has a portable teaching operation portion (also referred to as a pendant) which a worker carries, for example, when a teaching operation is performed, in addition to a control portion for controlling an operation of the robot. Hitherto, a composite cable (hereinafter called a cable) which uses a twisted pair wire or an optical fiber as a signal transmission path and which includes a power supply line used to supply electric power to the teaching operation portion, has been used for transmission of information between the teaching operation portion and the control portion.

A diagram illustrating the configuration of a conventional robot system described in Patent Document 1 as an example is shown in FIG. 7. In FIG. 7, reference numeral 101 designates a robot. Reference numeral 102 denotes a control portion which controls an operation of the robot 101. Reference numeral 103 designates a portable teaching operation portion. Reference numeral 104 denotes a cable through which information regarding an operation button, an emergency stop, and the like is transmitted between the control portion 102 and the portable teaching operation portion 103. A detail illustration of the portable teaching operation portion 103 is shown in FIG. 8. In FIG. 8, reference numeral 105 designates a substantially T-shaped casing. Reference numeral 106 denotes a hand portion which a worker grasps. A keyboard (or a keysheet) 107 to be operated when a teaching operation is performed, an LCD display 108 constituted by a liquid crystal panel, on which teaching data and information regarding the position of the robot and the like are displayed, and an emergency stop switch 109 (corresponding to the emergency stop operation section) are provided on an operation surface of the casing 105. An end of the cable 104 is connected to the casing 105.

When a worker depresses the emergency stop switch 109, emergency stop information is transmitted to the control portion 102 through the cable 104. The control portion 102 interrupts power supply to drive motors (not shown) of the robot 101 to thereby forcibly stop an operation of the robot 101. Consequently, the control portion 102 can surely stop an unexpected operation of the robot.

The aforementioned conventional robot system needs to perform, when a worker carries the portable teaching operation portion 103, a teaching operation by simultaneously trailing a thick and heavy cable. Thus, the aforementioned conventional robot system has problems that the worker has a heavy burden, and that the degree of freedom of motion at the time of teaching is constrained. Consequently, it has been strongly demanded to unwire the cable 104 connecting between the control portion 102 and the portable teaching operation portion 103. For example, Patent Document 2 describes means for implementing an emergency stop function in a robot system configured so that the portable teaching operation portion, which has an emergency stop operation section for bringing a robot by interrupting supply of electric power to a drive motor of a robot, and the control portion for controlling the robot communicate with each other through radio waves.

Patent Document 1: JP-A-2000-280193 (Page 7, FIGS. 1 and 2)
Patent Document 2: JP-A-2004-148488

DISCLOSURE OF THE INVENTION

Problems to be Solved by the Invention

However, in the system configured to wirelessly connect the control unit to the portable teaching operation portion, sometimes, radio communication therebetween is stopped due to the cause that, for example, the portable teaching operation portion is not powered on or breaks down. In this case, naturally, there is no means for transmitting information on an operation of the portable teaching operation portion to the control portion This operation includes an emergency stop operation. Thus, even when a worker depresses the emergency stop switch of the portable teaching operation portion to interrupt the supply of electric power to the drive motor, the worker cannot stop the robot.

When a situation, such as suspension of radio communication, occurs, the worker does not recognize a state in which the robot cannot be stopped by depressing the emergency stop switch of the portable teaching operation portion. Due to an unanticipated situation in which the robot cannot be stopped by depressing the emergency stop switch of the portable teaching operation portion, great damage can be caused in the robot and the peripheral thereof.

Similarly, in a case where the system is in a state in which emergency stop information is not transmitted to the control portion due to the deterioration of the condition of the communication between the portable teaching operation portion and the control portion, the robot cannot be stopped by depressing the emergency stop switch. However, the system has a problem that the worker cannot recognize such a state.

The invention is accomplished to solve such problems. An object of the invention is to provide a safe robot system adapted to always and clearly indicate a worker whether an emergency stop operation can be performed by an emergency stop operation section in an unwired portable teaching operation section, thereby to prevent occurrence of a misconception.

Means for Solving the Problems

To solve the above-described problem, the invention is constituted as follows.

According to the invention described in claim 1, there is provided a robot system including:
   a portable teaching operation portion, and
   a control portion,
   the portable teaching operation portion, which has an emergency stop operation section that interrupts supply of electric power to a drive motor of a robot to bring the robot into a stopped state, and the control portion, which controls the robot, wirelessly communicating with each other, wherein
   the portable teaching operation portion includes a display section indicating whether an emergency stop operation of causing the stopped state by the emergency stop operation section can be performed.

According to the invention described in claim 2, there is provided a robot system including:
   a portable teaching operation portion,
   a control portion,
   the portable teaching operation portion, which has an emergency stop operation section that interrupts supply of electric power to a drive motor of a robot to bring the robot into a stopped state, and the control portion, which controls the robot, wirelessly communicating with each other, wherein the control portion includes a display section indicating whether an emergency stop operation of causing the stopped state by the emergency stop operation section can be performed.

According to the invention described in claim 3, there is provided a robot system including:

a portable teaching operation portion, a control portion, the portable teaching operation portion, which has an emergency stop operation section that interrupts supply of electric power to a drive motor of a robot to bring the robot into a stopped state, and the control portion, which controls the robot, wirelessly communicating with each other, wherein the robot includes a display section indicating whether an emergency stop operation of causing the stopped state by the emergency stop operation section can be performed.

According to the invention described in claim 4, there is provided a robot system, wherein the display section is turned on or blinked to indicate that an emergency stop operation to be conducted by the emergency stop operation section can be performed.

According to the invention described in claim 5, there is provided a robot system, wherein the display section is arranged in a shape surrounding the emergency stop operation section.

According to the invention described in claim 6, there is provided a robot system, wherein the display section is turned on or blinked in yellow.

According to the invention described in claim 7, there is provided a robot system, wherein the display section is incorporated in the emergency stop operation section.

According to the invention described in claim 8, there is provided a robot system, wherein the display section is turned on or blinked in red.

According to the invention described in claim 9, there is provided a robot system, wherein the display section indicates a radio communication condition between the portable teaching operation portion and the control portion according to a blinking time interval.

Effects of the Invention

According to the invention described in one of claims 1 to 3, in a case where even when an emergency stop switch is depressed, the robot cannot be stopped due to no power-on of the portable teaching operation portion, to a failure thereof, or to a radio communication failure, the display section enables a worker to easily and visually recognize that no emergency stop operation can be performed. Consequently, an occurrence of an erroneous operation can be prevented.

Additionally, according to the invention described in claim 3, in a case where the robot to be taught is moved while the worker watched the robot, the worker can more naturally and visually recognize that an emergency stop operation to be conducted by the emergency stop operation section can he performed.

According to the invention described in claim 4, even in a case where a failure of the display section occurs, this can surely be detected.

According to the invention described in claim 5, the robot system can clearly distinguish between the display section and another status display section such as a pilot lamp. Additionally, the worker can easily and intuitively know that an indication displayed by the display section relates to the availableness/non-availableness of the emergency stop operation.

According to the invention described in claim 6, the worker's sense of visual incongruity between the display section and a wired portable teaching operation portion is lowered. Additionally, this display section is enabled to meet conventional product specifications.

According to the invention described in claim 7, the robot system can clearly distinguish between the display section and another status display section such as a pilot lamp. Additionally, the worker can easily and intuitively know that an indication displayed by the display section relates to the availableness/non-availableness of the emergency stop operation.

According to the invention described in claim 8, the worker's sense of visual incongruity between the display section and a wired portable teaching operation portion is lowered. Additionally, this display section is enabled to meet conventional product specifications.

According to the invention described in claim 9, a radio communication condition can be understood in more detail. Thus, a condition can be detected in advance, in which "the degree of a failure is not such that the emergency stop operation is ineffective and that factors of the failure are present". Also, necessary counter measures can be taken, for example, the portable teaching operation portion and the control portion are moved closer to each other.

Figure 1:
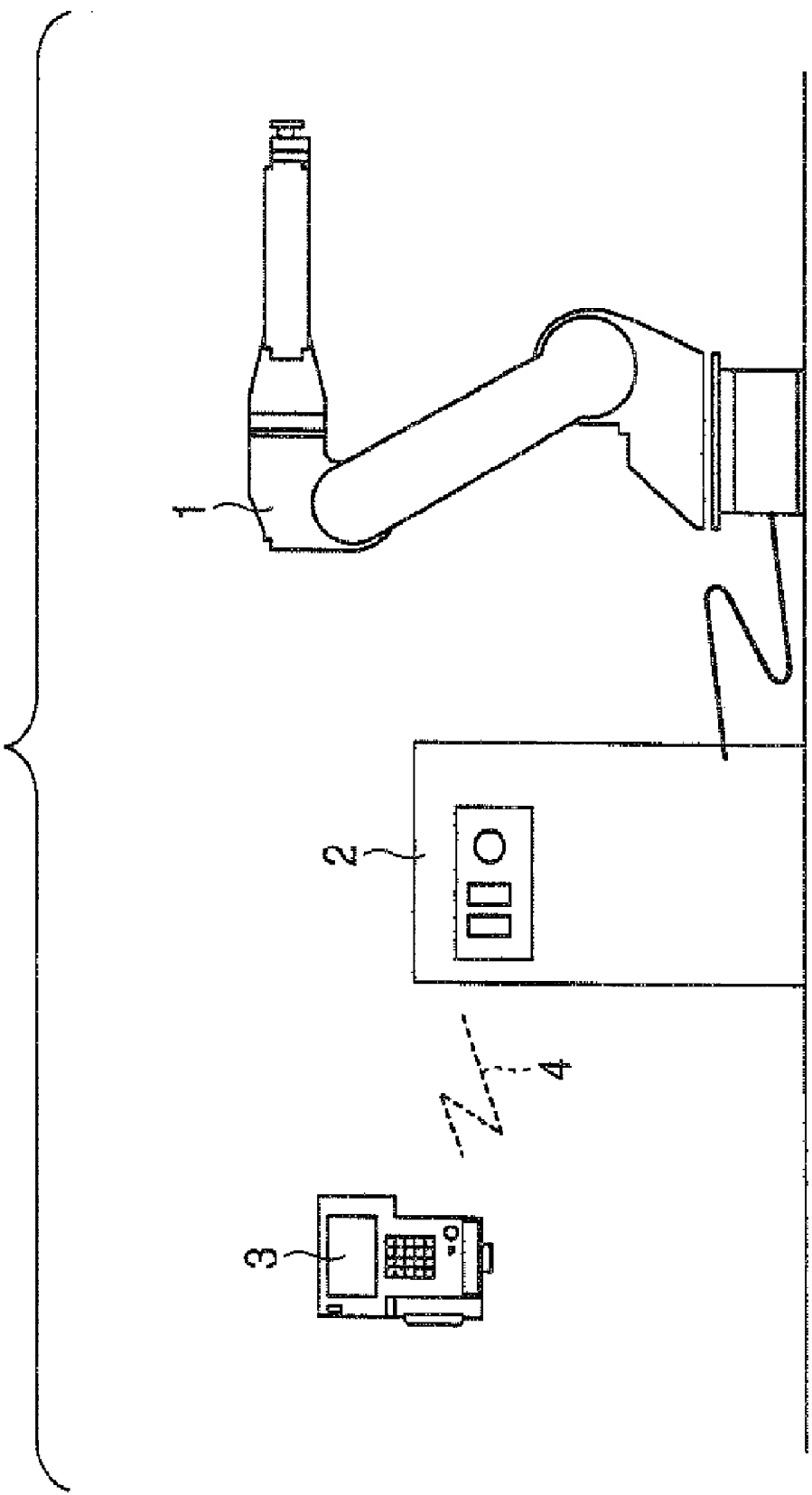
FIG. 1 is a diagram illustrating the configuration of a robot system according to a first embodiment of the invention.

DESCRIPTION OF REFERENCE NUMERALS AND SIGNS 1 robot
2 control portion
3 portable teaching operation portion
4 wireless communication
5 casing
6 hand portion
7 keyboard
8 LCD display
9 emergency stop switch
10 antenna
11 battery
12 power supply switch
13 display section
14 display section
15 display section 101 robot
102 control portion
103 portable teaching operation portion
104 cable
105 casing
106 hand portion
107 keyboard
108 LCD display
109 emergency stop switch

BEST MODE FOR CARRYING OUT THE INVENTION

Hereinafter, embodiments of the invention are described with reference to the accompanying drawings.

EMBODIMENT 1

FIG. 1 is a diagram illustrating the configuration of a robot system according to a first embodiment of the invention. In FIG. 1, reference numeral 1 designates a robot. Reference numeral 2 denotes a control portion for controlling an operation of the robot 1. Reference numeral 3 designates a portable teaching operation portion. Reference numeral 4 denotes radio communication for transmitting information regarding an operation button and an emergency stop between the control portion 2 and the portable teaching operation portion 3 (the radio communication denoted by reference numeral 4 is schematically illustrated).

Figure 2:
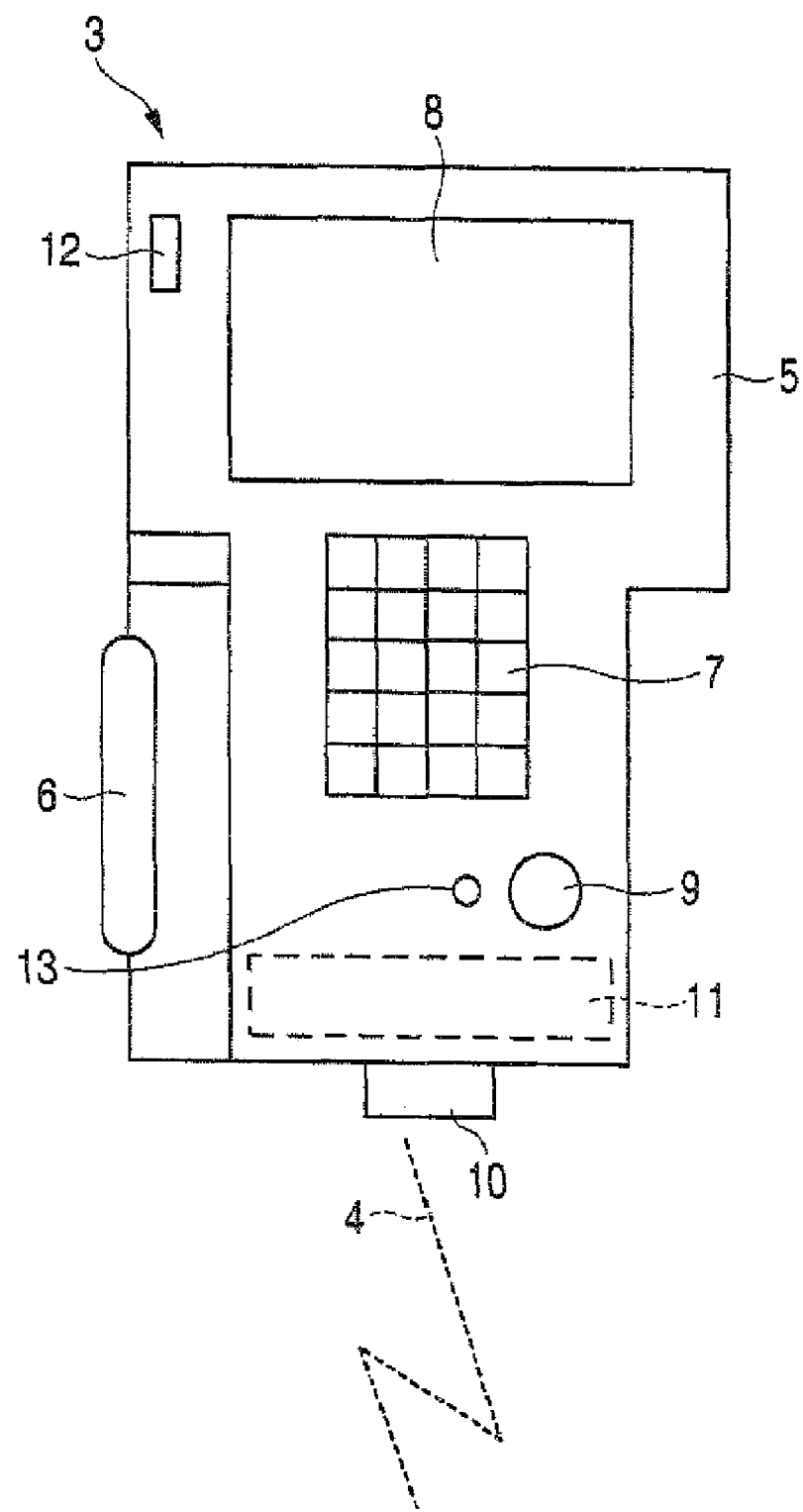
FIG. 2 is a detail diagram illustrating a portable teaching operation portion according to the first embodiment of the invention

A detail illustration of the portable teaching operation portion 3 is shown in FIG. 2. In FIG. 2, reference numeral 5 designates a substantially T-shaped casing. Reference numeral 6 denotes a hand portion which a worker grasps. A keyboard (or a keysheet) 7 to be operated when a teaching operation is performed, an LCD display 8 constituted by a liquid crystal panel, on which teaching data and information regarding the position of the robot and the like are displayed, and an emergency stop switch 9 (corresponding to the emergency stop operation section) are provided on an operation surface of the casing 5. Additionally, an antenna 10 serving as transmitting/receiving means for the radio communication 4, a battery 11 for supplying electric power independent of the control portion 2, and an electric power supply switch 12 for starting/stopping the supply of electric power are provided in the casing 5.

When the worker depresses the emergency stop switch 9, the emergency stop information is transmitted to the control portion 2 through the radio communication 4. The control portion 2 forcibly stops an operation of the robot 1 by interrupting the supply of electric power to drive motors (not shown) of the robot 1 (hereunder, this state will be referred to as an emergency stop state). Consequently, in response to an unexpected operation of the robot 1, the emergency stop of the robot 1 can surely be achieved.

In the system according to the invention, a display section 13 is newly provided, which indicates that an emergency stop operation to be conducted by the emergency stop switch 9 can be performed.

The display section 13 is a light emitting device, for example, a light emitting diode. The display section 13 is turned on to thereby indicate that the emergency stop operation to be conducted by the emergency stop switch 9 can be performed. Alternatively, the display section 13 is a device capable of displaying a character and a mark. The display section can be adapted to display specific characters and marks to thereby indicate that the emergency stop operation to be conducted by the emergency stop switch 9 can be performed.

The portable teaching operation portion 3 and the control unit 2 always and mutually checks the following items by the radio communication 4. That is, the presence of a power-on of the portable teaching operation portion 3, that of a communication failure in the radio communication 4, that of a internal processing circuit failure in each of the operation portion and the control unit, and that of failures, such as relay welding, of the emergency stop circuit in the control portion 2 are checked. Only in a case where it is determined as a result of mutually checking such items that both the operation portion and the control unit normally operate without failures, the portable teaching operation portion 3 performs a display, which indicates that the emergency stop operation to be conducted by the emergency stop switch 9 can be performed, through the display section 13.

According to the present system, the display section 13 turns off in a case where even when the emergency stop switch 9 is depressed, the robot 1 cannot be stopped due to no power-on of the portable teaching operation portion 3, to a failure thereof, or to a radio communication failure. Accordingly, the worker can easily and visually recognize that no emergency stop operation to be conducted by the emergency stop switch can be performed. Consequently, an occurrence of an erroneous operation can be prevented.

EMBODIMENT 2

A component finally interrupting the supply of electric power to the drive motor of the robot 1 by the emergency stop operation is the control portion 2. Thus, the control portion 2 can more reliably determine and indicate whether the emergency stop operation can be performed. A second embodiment of the invention takes this into consideration.

Figure 3:
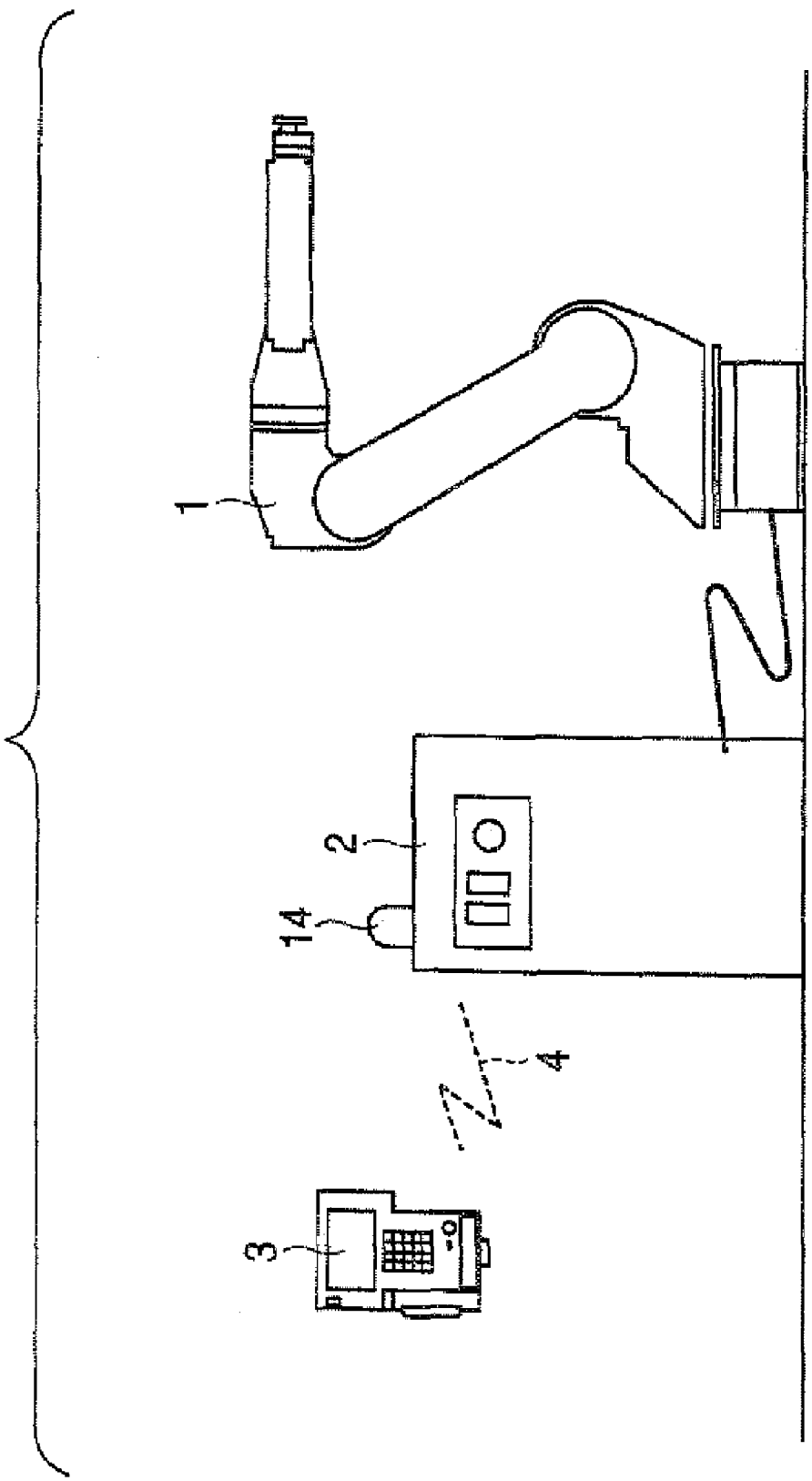
FIG. 3 is a diagram illustrating the configuration of a robot system according to a second embodiment of the invention.

FIG. 3 is a diagram illustrating the configuration of a robot system according to the second embodiment of the invention. The present embodiment is provided with a display section 14 indicating that the emergency stop operation to be conducted by the emergency stop switch 9 can be performed.

According to the present system, it can reliably be determined and indicated that the emergency stop operation to be conducted by the emergency stop switch 9 can be performed.

EMBODIMENT 3

In an actual teaching operation, the worker does not always visually observe the portable teaching operation portion at his hand. The worker frequently operates the portable teaching operation portion by a blind operation while watching a robot to be taught. In this case, the display section 13 provided on the portable teaching operation portion 3 is not always recognized by the worker.

Figure 4:
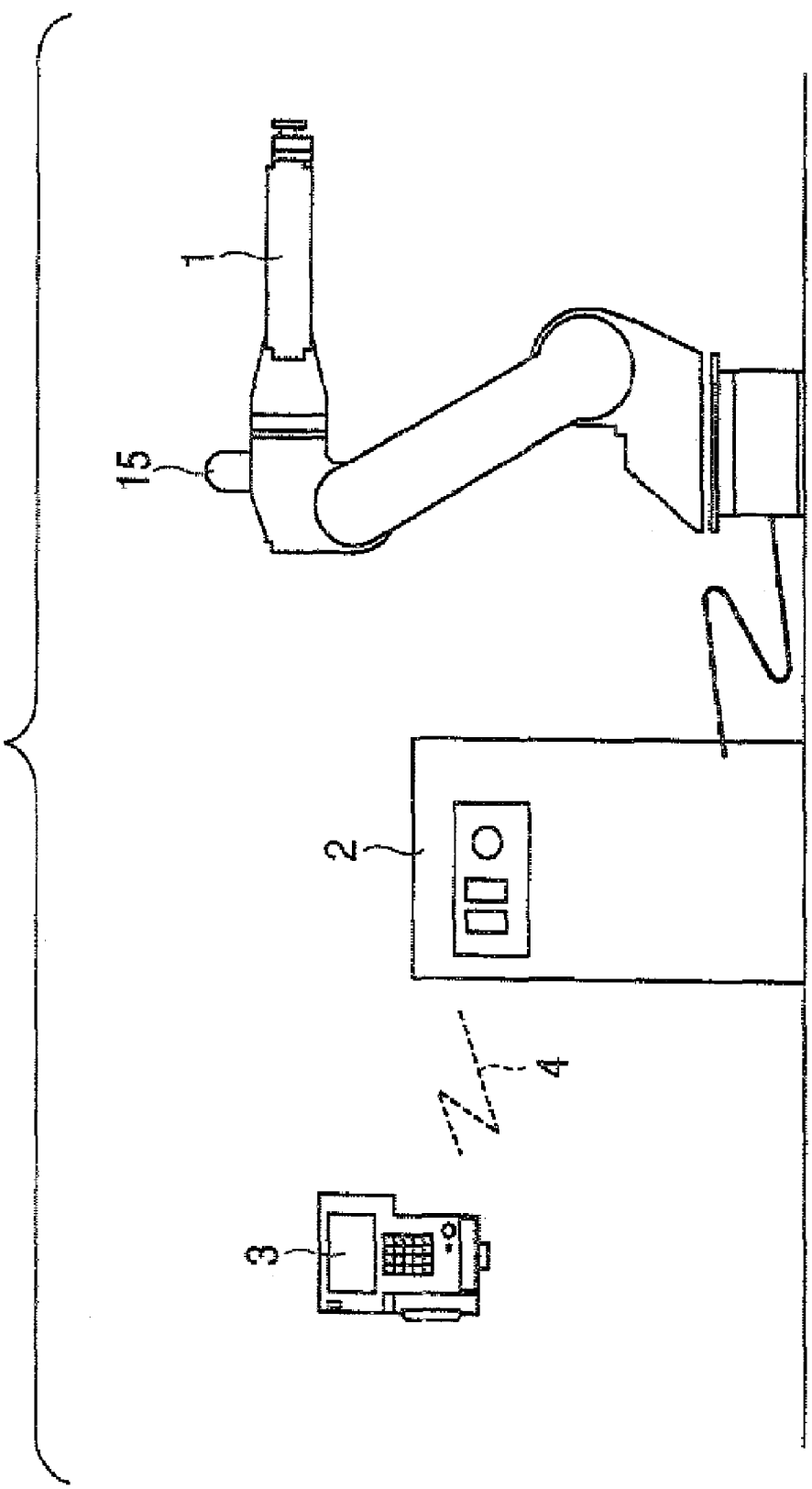
FIG. 4 is a diagram illustrating the configuration of a robot system according to a third embodiment of the invention.

A robot system dealing with such a problem is a third embodiment of the invention. FIG. 4 is a diagram illustrating the configuration of the robot system according to the third embodiment of the invention. According to the present embodiment, a display section 15, which indicates that the emergency stop operation to be conducted by the emergency stop switch 9 can be performed, is provided in the robot 1.

According to the present system, even in a case where the portable teaching operation portion is moved by the blind operation while the robot to be taught while the robot to be taught is watched, the worker can reliably and visually recognize that the emergency stop operation to be conducted by the emergency stop switch 9 can be performed.

EMBODIMENT 4

In the above-described embodiments, it is indicated by turning on the display section or by causing the display section to display an indication that the emergency stop operation to be conducted by the emergency stop switch 9 can be performed. However, there is a case where a failure of the display section occurs due to a trouble in a state in which the display section is turned on or off, and where the state of the display section is unchanged. In such a case, there is a problem that the state of the display section does not accurately reflect whether the emergency stop operation can be performed.

A robot system dealing with such a problem is a fourth embodiment of the invention. According to the fourth embodiment of the invention, the turn-on/off of the display section are alternately repeated or the displayed and non-displayed states of the display section are alternately and repeatedly caused. That is, the system causes the display section to perform what is called a blinking operation to thereby indicate whether the emergency stop operation can be performed.

According to the present system, the worker can visually check whether the emergency stop operation can be performed. Also, even when a failure of the display section occurs, it can reliably be detected whether the emergency stop operation can be performed.

EMBODIMENT 5

The display section 13 of the portable teaching operation portion 3 shown in FIG. 2 is difficult to distinguish from status display section such as a pilot lamp (not shown). Accordingly, the display section 13 has a problem that it is difficult to intuitively know that the indication displayed by the display section 13 relates to the availableness/non-availableness of the emergency stop operation.

Figure 5:
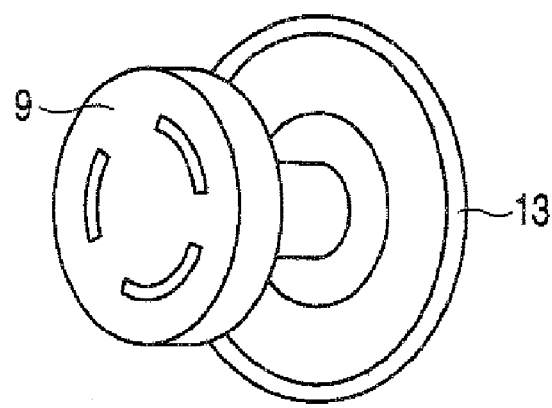
FIG. 5 is a perspective diagram illustrating an emergency stop operation section and a display section in a fifth embodiment of the invention.
Figure 5:
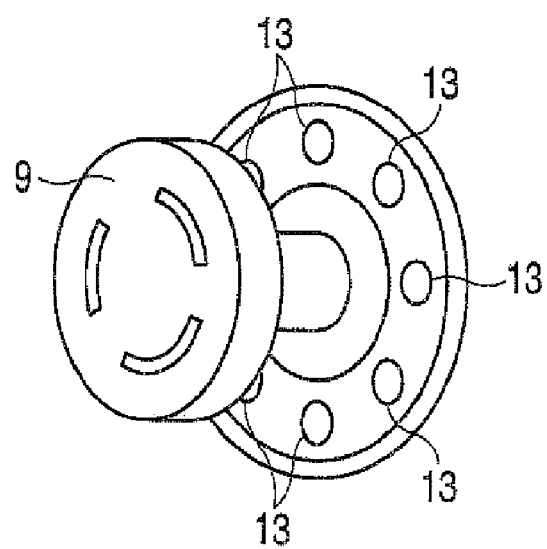

A robot system dealing with such a problem is a fifth embodiment of the invention. FIG. 5 is a perspective diagram illustrating an emergency stop switch 9 and a display section 13 in the fifth embodiment of the invention. Generally, in the conventional portable teaching operation portion, the emergency stop switch 9, which is a red mushroom type switch, is surrounded by a yellow frame to clearly show the emergency stop switch 9. As illustrated in FIG. 5(*a*), this arrangement is used without change. The display section 13 is arranged like a circle surrounding the emergency stop switch 9. The entire display section 13 is turned on or blinked to thereby indicate that the emergency stop operation to be conducted by the emergency stop switch 9 can be performed. Alternatively, to reduce a system cost, the system may be configured so that as illustrated in FIG. 5(*b*), several light emitting diodes are arranged around the emergency stop switch 9 as the display section.

The present system can clearly distinguish between the display section 13 and another status display section such as a pilot lamp. Additionally, the worker can easily and intuitively know that the indication displayed by the display section 13 relates to the availableness/non-availableness of the emergency step operation. Further, the display section 13 is turned on or blinked in yellow to thereby lower the worker's sense of visual incongruity between the display section 13 and a wired portable teaching operation portion. This display section 13 is enabled to meet conventional product specifications.

EMBODIMENT 6

Figure 6:
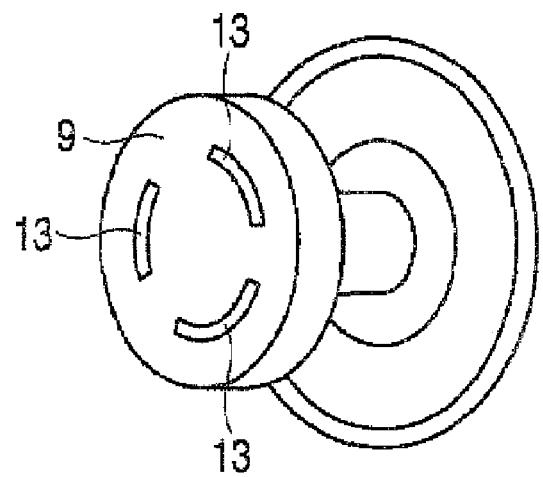
FIG. 6 is a perspective diagram illustrating an emergency stop operation section and a display section in a sixth embodiment of the invention.
Figure 6:
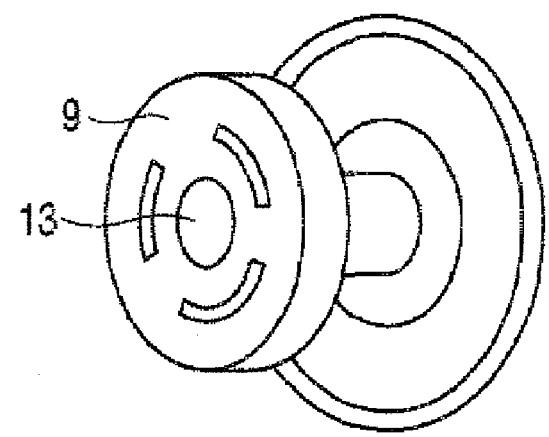
Figure 7:
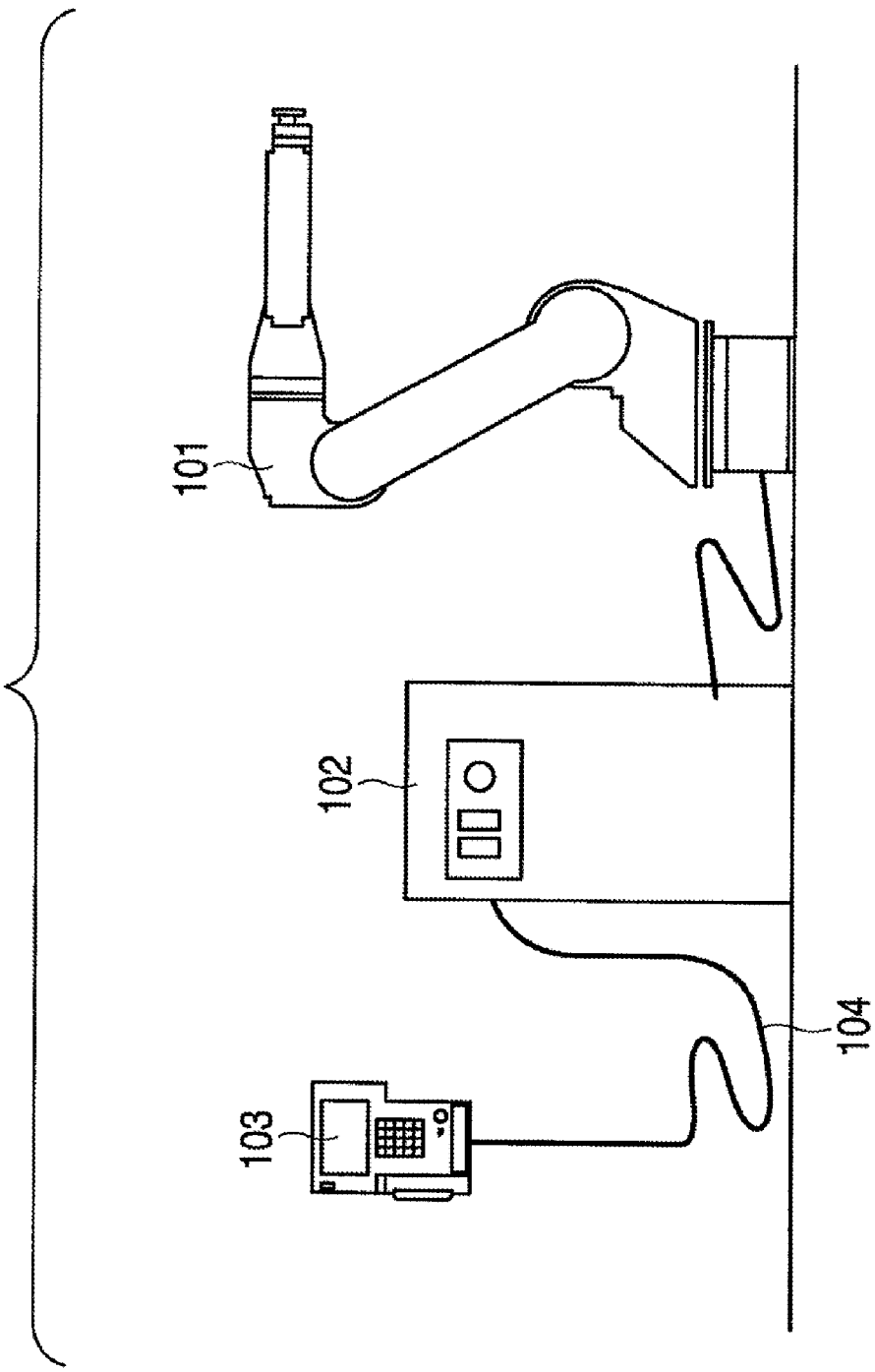
FIG. 7 is a diagram illustrating the configuration of a conventional robot system.
Figure 8:
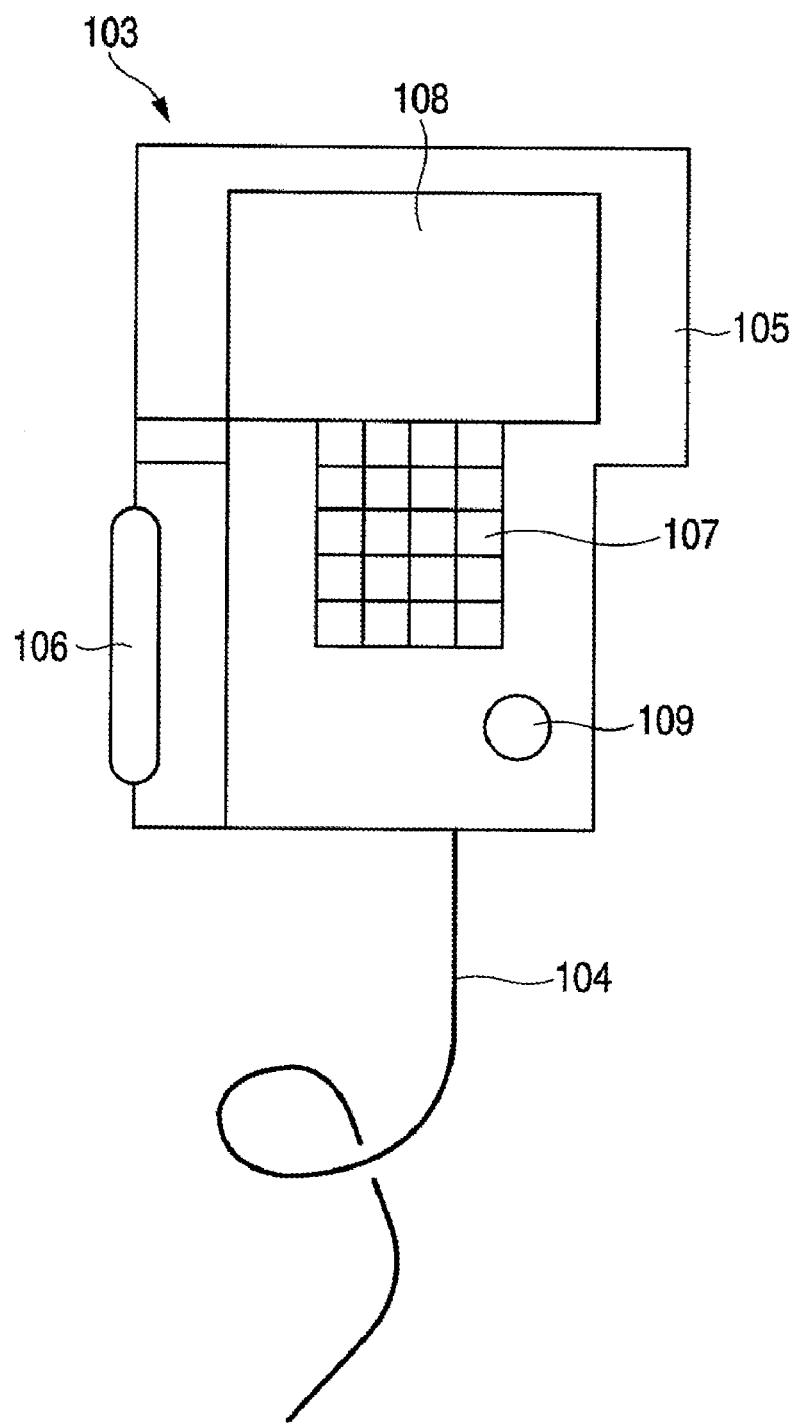
FIG. 8 is a detail diagram illustrating a conventional portable teaching operation portion.

FIG. 6 is a perspective diagram illustrating an emergency stop switch 9 and a display section 13 in a sixth embodiment of the invention. According to the present embodiment, the emergency stop switch 9, which is a red mushroom switch, incorporates the display section 13. As illustrated in FIG. 6(*a*), the present embodiment turns on or blinks marks described on a surface of the emergency stop switch 9 to thereby indicate that the emergency stop operation to be conducted by the emergency stop switch 9 can be performed. Alternatively, as illustrated in FIG. 6(*b*), a system can be configured so that a light emitting diode is disposed at a central portion of the emergency stop switch 9 as the display section.

The present system can clearly distinguish between the display section 13 and another status display section such as a pilot lamp. Additionally, the worker can easily and intuitively know that the indication displayed by the display section 13 relates to the availableness/non-availableness of the emergency stop operation. Further, the display section 13 is turned on or blinked in red to thereby lower the worker's sense of visual incongruity between the display section 13 and the wired portable teaching operation portion. This display section 13 is enabled to meet conventional product specifications.

EMBODIMENT 7

Although the aforementioned embodiments are configured so that the blinking time interval of the display section 13 is constant, the display section 13 can be modified so that the blinking time interval is shortened in a case where a radio communication condition is good, and that the blinking time interval is lengthened in a case where a radio communication condition is poor. According to the present system, since a radio communication condition can be known more in detail, a condition can be detected in advance, in which "the degree of a failure is not such that the emergency stop operation is ineffective and that factors of the failure are present". Also, necessary counter measures can be taken, for example, the portable teaching operation portion 3 and the control portion 2 are moved closer to each other.

The invention can be extended to other various configurations. Apparently, even in a case where the display section 13 is an auditory means such as a buzzer or an audio output, or a tactile means such as a vibration, pressing force information, or electrical stimulation, in addition to visual means, similar advantages can be obtained. Additionally, the display section 13 can employ a method of displaying information in the LCD display 8 originally mounted on the portable teaching operation portion 3.

INDUSTRIAL APPLICABILITY

The invention can be applied to display section for indicating whether the emergency stop operation to be conducted by the emergency stop operation section can be performed in an unwired portable teaching operation portion of an industrial robot for use in welding, painting, assembling, and the like.

The invention claimed is:

1. A robot system comprising:
a portable teaching operation portion, and
a control portion,
the portable teaching operation portion, which has an emergency stop operation section that interrupts supply of electric power to drive motors of a robot to bring the robot into a stopped state, and the control portion, which controls the robot, wirelessly communicating with each other,
wherein the robot system detects if the emergency stop operation can be performed by the portable teaching portion and the control portion, and
wherein
the portable teaching operation portion includes a display section indicating whether the emergency stop operation can be performed or whether the emergency stop operation cannot be performed.

2. The robot system according to claim 1, wherein
the display section is turned on or blinked to indicate that the emergency stop operation to be conducted by the emergency stop operation section can be performed.

3. The robot system according to claim 2, wherein
the display section indicates a radio communication condition between the portable teaching operation portion and the control portion according to a blinking time interval.

4. The robot system according to claim 1, wherein
the display section is arranged in a shape surrounding the emergency stop operation section.

5. The robot system according to claim 4, wherein
the display section is turned on or blinked in yellow.

6. The robot system according to claim 1, wherein
the display section is incorporated in the emergency stop operation section.

7. The robot system according to claim 6, wherein
the display section is turned on or blinked in red.

8. A robot system comprising:
a portable teaching operation portion, and
a control portion,
the portable teaching operation portion, which has an emergency stop operation section that interrupts supply of electric power to drive motors of a robot to bring the robot into a stopped state, and the control portion, which controls the robot, wirelessly communicating with each other,
wherein the robot system detects if the emergency stop operation can be performed by the portable teaching portion and the control portion, and
wherein
the control portion includes a display section indicating whether the emergency stop operation can be performed or whether the emergency stop operation cannot be performed.

9. The robot system according to claim 8, wherein
the display section is turned on or blinked to indicate that the emergency stop operation to be conducted by the emergency stop operation section can be performed.

10. The robot system according to claim 9, wherein
the display section indicates a radio communication condition between the portable teaching operation portion and the control portion according to a blinking time interval.

11. A robot system comprising:
a portable teaching operation portion, and
a control portion,
the portable teaching operation portion, which has an emergency stop operation section that interrupts supply of electric power to drive motors of a robot to bring the robot into a stopped state, and the control portion, which controls the robot, wirelessly communicating with each other,
wherein the robot system detects if the emergency stop operation can be performed by the portable teaching portion and the control portion, and
wherein
the robot includes a display section indicating whether the emergency stop operation can be performed or whether the emergency stop operation cannot be performed.

12. The robot system according to claim 11, wherein
the display section is turned on or blinked to indicate that the emergency stop operation to be conducted by the emergency stop operation section can be performed.

13. The robot system according to claim 12, wherein
the display section indicates a radio communication condition between the portable teaching operation portion and the control portion according to a blinking time interval.

* * * * *